United States Patent [19]
Bandurco et al.

[11] 3,714,182
[45] Jan. 30, 1973

[54] IMINO-BENZYL-PYRAZOLES

[75] Inventors: Victor Bandurco, Huntington Station; James R. Shroff, Bronx, both of N.Y.

[73] Assignee: U. S. V. Pharmaceutical Corporation

[22] Filed: Aug. 19, 1970

[21] Appl. No.: 65,304

[52] U.S. Cl. ............260/310 R, 260/566 D, 260/999
[51] Int. Cl. ..............................................C07d 49/36
[58] Field of Search ..................260/310 R

[56] References Cited

UNITED STATES PATENTS

| | | | |
|---|---|---|---|
| 2,926,170 | 2/1960 | Karmas et al. | 260/310 R |
| 2,928,842 | 3/1960 | Karmas | 260/310 R |
| 3,063,978 | 11/1962 | Lynn | 260/310 R |
| 3,248,426 | 4/1966 | Dvornik | 260/310 R |

Primary Examiner—Natalie Trousof
Attorney—Leon E. Tenenbaum

[57] ABSTRACT

Compounds of the formula

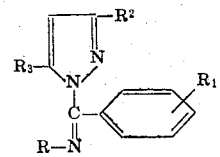

wherein R is alkyl, cycloalkyl, phenyl, substituted phenyl or phenylalkyl, $R_1$ is hydrogen, halogen, alkyl, trifluoromethyl, alkoxy, hydroxy or amino, $R_2$ is alkyl, phenylalkyl or carbalkoxy, and $R_3$ is hydrogen, alkyl, phenyl or substituted phenyl possess hypoglycemic activity.

8 Claims, No Drawings

IMINO-BENZYL-PYRAZOLES

This invention relates to new organic compounds having valuable pharmacological activity and to a process for the preparation of said compounds. In particular, the invention relates to imino-benzyl-pyrazoles of the formula

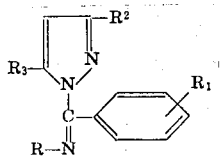

and their pharmaceutically acceptable, non-toxic acid addition salts, wherein

R is lower alkyl, phenyl, lower alkylphenyl, lower alkoxyphenyl, halophenyl, cycloalkyl, or phenyl-lower alkyl;

$R_1$ is hydrogen, lower alkoxy, lower alkyl, halogen, trifluoromethyl, hydroxy, or amino;

$R_2$ is lower alkyl, phenyl-lower alkyl, or carbalkoxy such as carbomethoxy or carbethoxy; and $R_3$ is hydrogen, lower alkyl, phenyl, halophenyl, lower alkylphenyl, or lower alkoxyphenyl.

The lower alkyl and lower alkoxy groups may be branched or straight chained and contain from one to five carbon atoms. The cycloalkyl groups contain from three to seven carbon atoms in the ring which may also carry a lower alkyl substituent.

Preferably, R is lower alkyl, phenyl or cyclohexyl, $R_1$ is hydrogen or lower alkoxy, $R_2$ is lower alkyl or carboalkoxy, and $R_3$ is lower alkyl.

According to the process of this invention, the imino-benzyl-pyrazoles were prepared by heating in an inert solvent an appropriately substituted benzimidoyl chloride of the formula

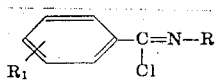

with an appropriately substituted pyrazole of the formula

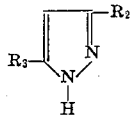

in the presence of an alkaline agent such as a tertiary amine, an alkali amide, an alkali alkoxide, or an alkali hydride.

The benzimidoyl chlorides were prepared by first preparing a benzamide from a corresponding benzoyl chloride and an amine under the standard Schotten-Baumann procedure and then converting this amide to the benzimidoyl chloride by treatment with thionyl chloride or phosphorus pentachloride according to the procedure in Organic Syntheses, Collective Vol. 4, page 283 (1962).

The pyrazoles were prepared by the reaction of β-dicarbonyl compounds with hydrazine in accordance with the procedure in Ber. 59, 607 (1926).

Suitable inert solvents include hydrocarbons such as hexane, heptane, benzene, toluene and xylene, nitriles such as acetonitrile, and dimethylformamide.

The invention will be more fully illustrated in the examples that follow, which examples are given by way of illustration and are not to be considered as limiting.

EXAMPLE I

3-Carbomethoxy-1-[2-methyl-(N-phenyliminobenzyl)]-5-(4-chlorophenyl)pyrazole

To a suspension of 1.6 g. (0.048 mole) of 50% NaH in 100 ml. dry distilled dimethyl-formamide, was added 7.8 g. (0.03 mole) 3-carbomethoxy-5-(4-chlorophenyl)-pyrazole over a period of 15 minutes. After the evolution of hydrogen gas had ceased, 7.6 g. (0.03 mole) of 2-methyl-N-phenylbenzimidoyl chloride was added dropwise into the reaction mixture. The reaction mixture was heated to 100° for a period of 24 hrs., and then cooled. It was filtered and the filtrate was evaporated in vacuum to remove the dimethylformamide. The residue was dissolved in water and the organic material extracted with ether. Concentration of the dried ether layer yielded 6 g. of the crude product. Two recrystallizations from n-heptane afforded 3-carbomethoxy-1-[2-methyl-(N-phenyliminobenzyl)]-5-(4-chlorophenyl) pyrazole, m.p. 138°–40°, in 17 percent yield (2.5 g.).

EXAMPLE II

3-Carbomethoxy-1-(N-ethyliminobenzyl)-5-methyl-pyrazole

To a mixture of 7.0 g. (0.05 mole) methyl 5-methyl-pyrazole-3-carboxylate and 5.3 g. (0.05 mole) triethylamine in 75 ml. dry acetonitrile was added 7.5 g. (0.05 mole) N-ethylbenzimidoyl chloride over a period of one-half hr. After the addition was completed, the mixture was heated to reflux for a period of 5 hrs. After the triethylamine hydrochloride was removed by filtration, concentration of the acetonitrile layer and distillation of the residue afforded 3-carbomethoxy-1-(N-ethyliminobenzyl)-5-methyl pyrazole, b.p. 130°–32° (1mm), $n_D$ 1.5539, in 37 percent yield (5.0 g.).

EXAMPLE III 1-(N-Isobutyliminobenzyl)-3,5-dimethyl-pyrazole

To a suspension of 7.8 g. (0.2 mole) sodamide in 130 ml. dry toluene was added 9.8 g. (0.1 mole) 3,5-dimethyl pyrazole dropwise over a period of 10 min. The reaction mixture was heated to reflux for 3 hrs. and then cooled. To the cooled solution was added 19.5 g. (0.1 mole) N-isobutylbenzimidoyl chloride dropwise, and the resulting solution refluxed for 4 hrs. Two hundred ml. water was added to the reaction mixture and the organic layer separated from the aqueous fraction. Concentration of the dried toluene layer and distillation of the residue (25.0 g.) afforded 1-(N-isobutyliminobenzyl)-3,5-dimethyl pyrazole, b.p. 102°–6° (0.02 mm.), $n_D^{25}$ 1.5390, in 43 percent yield (11.0 g.).

In accordance with the procedures described above and set forth in the examples, the following additional compounds were prepared.

| R  | $R_1$ | $R_2$ | $R_3$ | M.P. or B.P./mm °C |
|----|-------|-------|-------|---------------------|
| Et | H     | Me    | Me    | 82–84/0.03          |

| | | | | |
|---|---|---|---|---|
| Cyclohex | H | Me | Me | 118/0.05 |
| Ph | H | Me | Me | 130–32/0.05 |
| p-MeOC$_6$H$_4$ | H | Me | Me | 160–64/13 |
| n-Pr | H | COOMe | Me | 104–10/0.1 |
| Me | H | COOMe | Me | 138–40/0.1 |
| i-But | p-Me | COOMe | Me | 160–62/0.25 |
| i-But | m-CF$_3$ | COOMe | Me | 120/0.1 |
| Ph | H | COOMe | Me | 99–100 |
| i-But | p-F | COOMe | Me | 140–44/0.04 |
| n-But | H | COOMe | Me | 142/0.2 |
| i-Am | H | COOMe | Me | 120/0.08 |
| Cyclohex | H | COOMe | Me | 89–90 |
| Ph | o-MeO | COOMe | Me | 134–5 |
| Ph | o-Cl | COOMe | Me | 118–20 |
| Ph | o-Me | COOMe | Me | 104–7 |
| p-MeC$_6$H$_4$ | p-Me | COOMe | Me | 116–18 |
| Ph | 3,4-(Cl)$_2$ | COOMe | Me | 105–6 |
| p-ClC$_6$H$_4$ | H | COOMe | Me | 88–90 |
| p-MeOC$_6$H$_4$ | H | COOMe | Me | 70–72 |
| p-MeOC$_6$H$_4$ | H | COOMe | p-ClC$_6$H$_4$ | 140–42 |
| p-MeC$_6$H$_4$ | pCH$_3$ | COOMe | p-ClC$_6$H$_4$ | 147–50 |
| Ph | H | COOMe | p-ClC$_6$H$_4$ | 187–8 |
| Cyclohex | H | COOMe | p-ClC$_6$H$_4$ | 139–41 |
| Me | H | COOMe | p-ClC$_6$H$_4$ | 114–16 | n=normal  Me=methyl
i=iso  Et=ethyl
p=para  Pr=propyl
m=meta  But=butyl
Ph=phenyl  Am=amyl The compounds of this invention are potent hypoglycemic agents, producing a reduction of up to 34 percent in the blood sugar of glucose primed rats when administered 100 mg./kg. p.o. The compounds can be combined with solid or liquid pharmaceutical carriers and formulated into tablets, powders or capsules or dissolved in suitable solvents for oral or parenteral administration.

We claim:
1. A compound of the formula

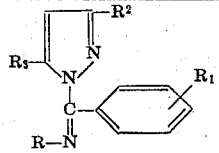

wherein
R is lower alkyl, phenyl, lower alkylphenyl or cycloalkyl of from three to seven carbon atoms;
R$_1$ is hydrogen, lower alkyl, lower alkoxy, halogen or trifluoromethyl;
R$_2$ is lower alkyl or carbo-lower alkoxy; and
R$_3$ is lower alkyl, phenyl or halophenyl.

2. A compound according to claim 1 wherein
R is isobutyl
R$_1$ is meta-trifluoromethyl,
R$_2$ is carbomethoxy, and
R$_3$ is methyl 3. A compound according to claim 1 wherein
R$_1$ is hydrogen or lower alkoxy;
R$_2$ is methyl or carbomethoxy, and
R$_3$ is lower alkyl.

4. A compound according to claim 3 wherein
R is ethyl;
R$_1$ is hydrogen, and
R$_2$ and R$_3$ are methyl.

5. A compound according to claim 3 wherein
R is phenyl;
R$_1$ is hydrogen, and
R$_2$ and R$_3$ are methyl.

6. A compound according to claim 3 wherein
R is ethyl;
R$_1$ is hydrogen;
R$_2$ is carbomethoxy, and
R$_3$ is methyl.

7. A compound according to claim 3 wherein
R is phenyl;
R$_1$ is hydrogen;
R$_2$ is carbomethoxy, and
R$_3$ is methyl.

8. A compound according to claim 3 wherein
R is cyclohexyl;
R$_1$ is hydrogen;
R$_2$ is carbomethoxy, and
R$_3$ is methyl.

* * * * *